(12) United States Patent
Bassett et al.

(10) Patent No.: US 9,342,508 B2
(45) Date of Patent: May 17, 2016

(54) DATA LOCALIZATION TEMPLATES AND PARSING

(75) Inventors: Charles D Bassett, Seattle, WA (US); Robert M. Dolin, Seattle, WA (US); Oludare V. Obasanjo, Renton, WA (US); Benjamin C. Walters, Seattle, WA (US); John P. Bruno, Snoqualmie, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 982 days.

(21) Appl. No.: 12/407,401

(22) Filed: Mar. 19, 2009

(65) Prior Publication Data

US 2010/0241417 A1 Sep. 23, 2010

(51) Int. Cl.
*G06F 17/20* (2006.01)
*G06F 17/28* (2006.01)
*G06F 9/44* (2006.01)

(52) U.S. Cl.
CPC ............ *G06F 17/289* (2013.01); *G06F 9/4448* (2013.01)

(58) Field of Classification Search
CPC .. G06F 9/4448; G06F 17/243; G06F 17/3089
USPC .......................................................... 704/8
See application file for complete search history.

(56) References Cited

U.S. PATENT DOCUMENTS

| | | | |
|---|---|---|---|
| 6,002,997 A | 12/1999 | Tou | |
| 6,976,090 B2 | 12/2005 | Ben-Shaul et al. | |
| 7,386,624 B2 | 6/2008 | Venkatsubra | |
| 7,669,123 B2 | 2/2010 | Zuckerberg et al. | |
| 8,489,980 B2 * | 7/2013 | Lakritz | 715/200 |
| 2003/0023440 A1 * | 1/2003 | Chu | 704/249 |
| 2004/0205698 A1 | 10/2004 | Schliesmann | |
| 2004/0267762 A1 * | 12/2004 | Tunning et al. | 707/100 |
| 2005/0105712 A1 | 5/2005 | Williams et al. | |
| 2005/0198031 A1 | 9/2005 | Pezaris | |
| 2006/0002317 A1 | 1/2006 | Venkata et al. | |
| 2006/0004836 A1 * | 1/2006 | Dhingra | 707/102 |
| 2006/0123053 A1 * | 6/2006 | Scannell, Jr. | 707/104.1 |
| 2006/0173985 A1 | 8/2006 | Moore | |
| 2006/0206713 A1 * | 9/2006 | Hickman et al. | 713/176 |
| 2006/0253489 A1 | 11/2006 | Kahn et al. | |
| 2007/0061244 A1 * | 3/2007 | Ramer et al. | 705/37 |
| 2007/0061245 A1 * | 3/2007 | Ramer et al. | 705/37 |
| 2007/0067848 A1 | 3/2007 | Gustave | |
| 2007/0078857 A1 | 4/2007 | Punaganti | |
| 2007/0094042 A1 * | 4/2007 | Ramer et al. | 705/1 |
| 2007/0094156 A1 | 4/2007 | Isaacs | |

(Continued)

FOREIGN PATENT DOCUMENTS

WO WO-2008131452 10/2008

OTHER PUBLICATIONS

"Non-Final Office Action", U.S. Appl. No. 12/407,253, (Oct. 27, 2011), 7 pages.

(Continued)

*Primary Examiner* — Jakieda Jackson
(74) *Attorney, Agent, or Firm* — Judy Yee; Micky Minhas

(57) ABSTRACT

Localization techniques are described. In an implementation, data is parsed from a feed of data that is public and not localized. A template is formed from the data for each locale that is to be supported. The data that is localized for a particular locale is presented is based on a particular template for the particular locale.

20 Claims, 11 Drawing Sheets

(56) References Cited

U.S. PATENT DOCUMENTS

| | | | |
|---|---|---|---|
| 2007/0112714 A1* | 5/2007 | Fairweather | 706/46 |
| 2007/0124208 A1 | 5/2007 | Schachter et al. | |
| 2007/0124285 A1 | 5/2007 | Wright | |
| 2007/0192674 A1 | 8/2007 | Bodin | |
| 2007/0198273 A1* | 8/2007 | Hennecke | 704/277 |
| 2007/0198526 A1 | 8/2007 | Pitkow | |
| 2008/0013697 A1 | 1/2008 | Lemieux | |
| 2008/0046976 A1 | 2/2008 | Zuckerberg | |
| 2008/0066172 A1 | 3/2008 | Tarsi | |
| 2008/0126476 A1 | 5/2008 | Nicholas et al. | |
| 2008/0154883 A1* | 6/2008 | Chowdhury et al. | 707/5 |
| 2008/0172458 A1 | 7/2008 | Middleton | |
| 2008/0175239 A1 | 7/2008 | Sistanizadeh et al. | |
| 2008/0201386 A1 | 8/2008 | Maharajh et al. | |
| 2008/0244091 A1 | 10/2008 | Moore et al. | |
| 2008/0256170 A1 | 10/2008 | Hayashi | |
| 2008/0288889 A1* | 11/2008 | Hunt et al. | 715/810 |
| 2009/0048821 A1* | 2/2009 | Yam et al. | 704/3 |
| 2009/0077022 A1* | 3/2009 | Cuthbert | 707/3 |
| 2009/0164301 A1 | 6/2009 | O'Sullivan et al. | |
| 2009/0254931 A1* | 10/2009 | Pizzurro et al. | 725/5 |
| 2010/0241579 A1 | 9/2010 | Bassett | |
| 2010/0241755 A1 | 9/2010 | Bassett | |
| 2010/0250735 A1* | 9/2010 | Andersen | 709/224 |
| 2010/0287049 A1* | 11/2010 | Rousso et al. | 705/14.53 |
| 2011/0190021 A1* | 8/2011 | David | 455/518 |
| 2011/0209047 A1 | 8/2011 | Olsen et al. | |
| 2013/0079034 A1* | 3/2013 | Taylor et al. | 455/456.2 |

OTHER PUBLICATIONS

"webgen", retrieved at <<http://webgen.rubyforge.org/documentation/manual.html>>, Dec 19, 2008, pp. 1-10.

Huston Geoff, "Internationalizing the Internet", retrieved at <<http://www.circleid.com/posts/internationalizing_the_internet/>>, Nov 21, 2006, pp. 11.

"Data with Additional 'Attributes'", retrieved at <<http://markmail.org/download.xqy?id=oic342sagjvsuxz4&number=1>>, pp. 6.

"Non-Final Office Action", U.S. Appl. No. 12/406,665, (Feb. 14, 2011),13 pages.

"Google, Yahoo both Working on Next Generation Social Networks", Retrieved from: http://www.techcrunch.com/2007/07/08/doodle-yahoo-both-workind-on-next-generation-social-networks/ on Dec. 15, 2008., 29 Pages.

Gotta, Mike "More Thoughts on Social Presence", Retrieved from http://ccsblog.burtongroup.com/collaboration_and_content/2008/09/more-thoughts-o.html on Dec. 15, 2008., 4 Pages.

"webgen", Retrieved from http://webgen.rubyforge.org/documentation/manual.html on Dec, 19, 2008., 10 Pages.

Huston, Geoff "Internationalizing the Internet", Retrieved from http://www.circleid.com/posts/internationalizing_the_internet/., 11 Pages.

"Data with Additional 'Attributes'", Retrieved from http://markmail.org/download.xgy?id=oic342sagjvsuxz4&number=1., 6 Pages.

Rose, Ian et al., "Cobra: Content-based Filtering and Aggregation of Blogs and RSS Feeds", Retrieved from http://www.usenix.org/event/nsdi07/tech/full_papers/rose/rose_html/index.html on Dec. 16, 2008., 18 Pages.

"Final Office Action", U.S. Appl. No. 12/406,665, (Jul. 21, 2011),19 pages.

"Facebook Company Timeline", Retrieved from: <http://www.facebook.com/press/info.php?timeline> on Sep. 23, 2010, 4 pages.

"Non-Final Office Action", U.S. Appl. No. 12/406,665, (Sep. 30, 2010), 10 pages.

"Final Office Action", U.S. Appl. No. 12/407,253, (Apr. 11, 2013), 8 pages.

"Non-Final Office Action", U.S. Appl. No. 12/406,665, Aug. 30, 2013, 18 pages.

"Final Office Action", U.S. Appl. No. 12/406,665, Jan. 7, 2014, 20 pages.

OPSAHL, "Facebook's Eroding Privacy Policy: A Timeline", Electronic Frontier Foundation, Apr. 28, 2010, 4 pages.

"Non-Final Office Action", U.S. Appl. No. 12/407,253, Nov. 7, 2014, 15 pages.

"Non-Final Office Action", U.S. Appl. No. 12/406,665, Feb. 10, 2015, 20 pages.

U.S. Appl. No. 12/406,665, Amendment After Final Office Action, Nov. 23, 2015, 12 pages.

U.S. Appl. No. 12/406,665, Final Rejection dated Aug. 13, 2015, 23 pages.

U.S. Appl. No. 12/406,665, Amendment dated May 7, 2015, 18 pages.

U.S. Appl. No. 12/406,665, Amendment After Final Office Action, Apr. 4, 2014, 16 pages.

U.S. Appl. No. 12/406,665, Amendment, Nov. 21, 2013, 16 pages.

U.S. Appl. No. 12/406,665, Amendment After Final Office Action, Sep. 14, 2011, 11 pages.

U.S. Appl. No. 12/406,665, Amendment, Jun. 12, 2011, 11 pages.

U.S. Appl. No. 12/406,665, Amendment, Dec. 9, 2010, 10 pages.

U.S. Appl. No. 12/407,253, Notice of Abandonment, Jul. 8, 2015, 2 pages.

U.S. Appl. No. 12/407,253, Amendment After Final Office Action, Jul. 8, 2013, 16 pages.

U.S. Appl. No. 12/407,253, Amendment, Jan. 9, 2012, 15 pages.

* cited by examiner

DATA LOCALIZATION TEMPLATES AND PARSING

BACKGROUND

Social network services allow members to share data (e.g., content) with other members. With the increasing popularity of social network services, more and more members are joining from different countries, using different languages, and so forth. As a result, content that is created in a human language may be accessed by other members who are not familiar with the human language used to express the content.

SUMMARY

Localization techniques are described. In an implementation, data is parsed from a feed of data that is public and not localized. A template is formed from the data for each locale that is to be supported. The data that is localized for a particular locale is presented is based on a particular template for the particular locale.

In an implementation, one or more computer-readable media comprise instructions that are executable to provide a service. The service is configured to parse content, based on a canonicalization pattern in the content, from a third party source. The content is publically available and includes text that is not localized. The instructions are further executable to present the text in a human language that corresponds to a locale from which a request for the content is received. The human language is different from a human language that is implemented by the text that is not localized.

In an implementation, one or more computer-readable media comprise instructions that are executable to form a plurality of templates that each implement a human language for use by a processor that is to execute the instructions. The templates include localized data parsed from data that is not localized. The instructions are further configured to present the localized data in a particular human language that is different from a human language that is used for the data that is not localized. The presentation is made through use of a particular template for the particular human language and in response to a request for the data expressed in the particular said human language.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

The increasing popularity of social network services has resulted in more members that use different human languages. Thus, data posted by one member may not be understood by other members of the social network service. For example, data posted by a member in English may not be understood by other members who are not familiar with the English language. In addition, the data may not be locally relevant for a member from a different culture viewing the data. Although the member posting the data may want the data understandable to the other members, often making the data understandable to members that do not use the same language may be tedious and time consuming.

Techniques are described which may be used to localize data, such as content, to be relevant to members of a social network service that are not familiar with one or more of a human language in which the data is expressed, cultural aspects related to the data, and so on. In an implementation, data is parsed from a feed of data that is publicly available but is not localized. For example, text expressed in the English language may be parsed from a photography data feed. Templates for each language that is to be supported are formed from the data. For example, the text in English may be translated into Spanish and included in a template for the Spanish language. In a similar manner, the English text may be translated in to German and included in another template for the German language. The data may be localized for presentation for a particular locale based on the particular template that corresponds to the locale. As a result, a member that unfamiliar with the human language in which the content is expressed may better understand the content without burdening a user who posted the content. In some implementations the localization is based on a canonicalization pattern in the feed of data.

In the following discussion, an example environment and systems are first described that are operable to perform one or more techniques that may be implemented by a social network service. Example procedures are then described that may be implemented using the example environment as well as other environments. Accordingly, implementation of the procedures is not limited to the environment and the environment is not limited to implementation of the procedures.

Example Environment

Figure 1:
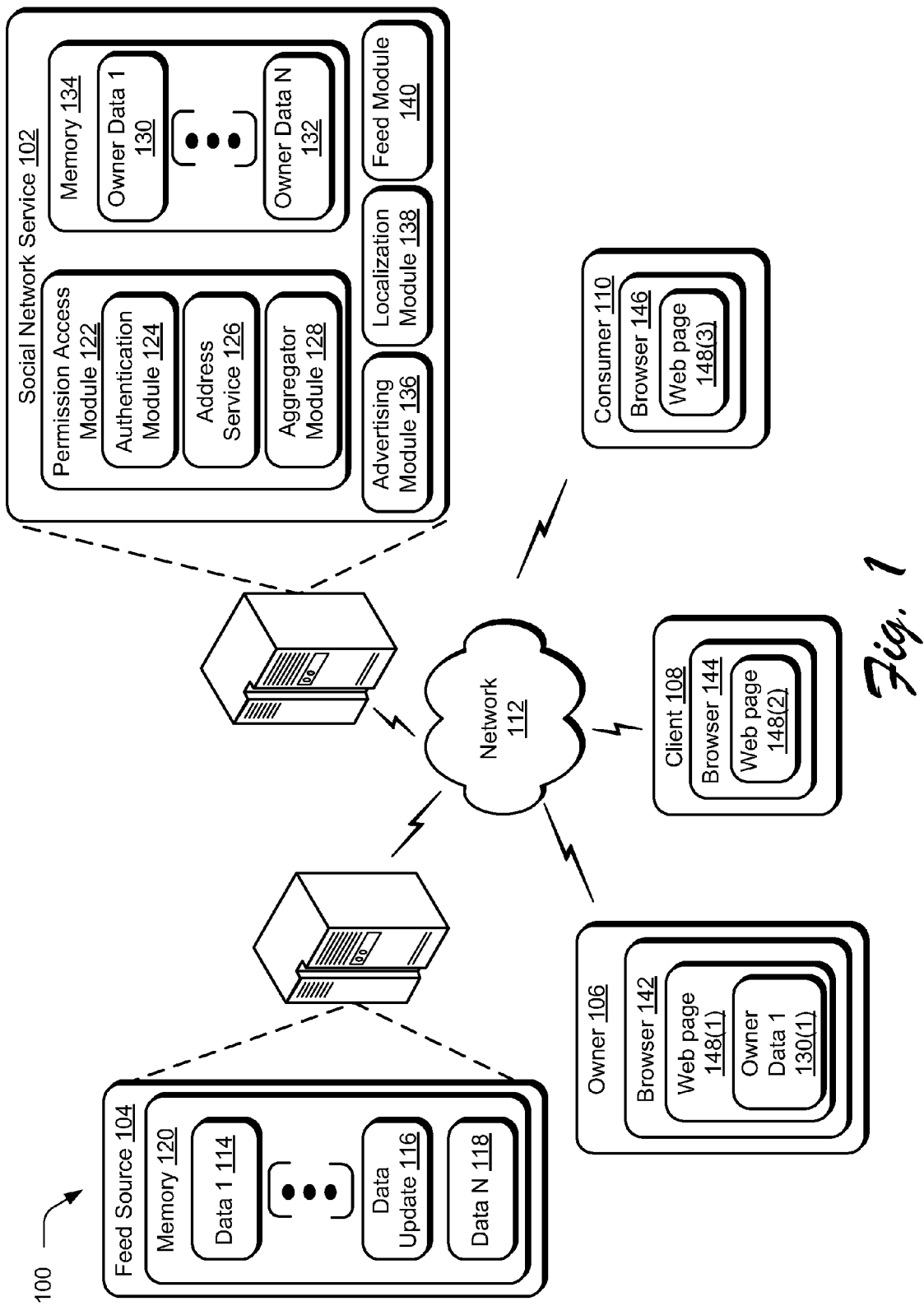
FIG. 1 is an illustration of an environment in an example implementation that is operable to perform various social network related techniques for sharing data from feeds of data that are publicly available.

FIG. 1 is an illustration of an environment 100 in an example implementation that is operable to employ techniques for use in sharing data via a network service.

At times in this description various forms of data are discussed. For example, data may include content, such as: photos, video, audio clips, music files, text, blog entries, combinations of the foregoing, and so on. Data may also include data that describes other data. Further, at times in the discussion, data may be identified with reference to other data. For example, further data may be data that forms an update to existing data. A variety of other examples are contemplated.

In embodiments, the data is shared via a web site that is maintained by the network service (illustrated as a social network service 102). Although the social network service 102 is discussed, other network services may implement the described techniques, approaches, and so forth. The illustrated environment 100 includes the social network service 102, a feed source 104, and members (illustrated as: an owner 106, a client 108, and a consumer 110) that are communicatively coupled by a network 112. For additional clarity, a member may also relate to a user or person who operates a logical client of the social network service 102, such as software, a device, and so forth.

In the following discussion, the feed source 104, the social network service 102, and the members may be representative of one or more entities. For example, although the feed source 104 is illustrated as being provided by a single server, multiple servers may be used to provide feeds of data.

The feed source 104 is representative of functionality to provide a feed of data via the network 112. For example, the feed source 104 may maintain a web site that permits users to post content and/or access content from the feed source 104. As illustrated, memory 120 associated with the feed source includes Data 1 114, Data Update 116, and Data N 118. For clarity in the discussion solely, users of the social network service 102 may be referred to as members. It is to be appreciated that a member may also make use of the feed source, e.g., a member may also be a user of the feed source. Users of the feed source (e.g., the owner 106) may store data for access via the web site maintained by the feed source 104. Example feeds of data include feeds of content such as photograph feeds, video feeds, blogs, and so forth.

The feed source 104 may provide data that is publicly available via the network 112. Some of this data may be unsecured. However, in some instances, the feed source 104 may impose nominal checks on the accessibility of data. For instance, the feed source 104 may request that users successfully complete a human interactive proof (HIP) challenge before the data is accessed. In other instances, the feed source 104 may request that users register (e.g., subscribe for an account), provide an electronic mail address, and so forth.

As illustrated, the feed source 104 includes memory 120 to store the feeds of data. The feed source may, for instance, use the memory 120 to store photographs posted via the web site. In this way, the feed source 104 may permit other users such as the user's friends, family, or the public-at-large to view the photographs.

The feed source 104 may be communicatively coupled to the social network service 102 via the network 112. The social network service 102 is representative of functionality to share data between members of the social network service 102. The social network service 102 may permit members to communicate the data with other members of the network service via a web site.

Although the social network service 102 may be used by members to communicate data that is publicly available from third party feeds of data, members may also share additional data that is posted to the social network service 102. The additional data may be related to the data from the feed source 104. For example, additional data may be a caption or a description of a video from the feed source 104. In this way a member may augment data stored with the feed source with data available from the social network service 102.

For convenience, the functions performed by social network service 102 are described with respect to modules. As is to be appreciated, the modules in the social network service 102 may be arranged in a variety of ways and the described functions may be performed by a single module, performed by sub-modules, performed by a combination of modules, and so forth. For example, the modules may be executed by one or more processors for the social network service 102.

The social network service 102 may include a permission access module 122 having an authentication module 124, an address service 126, and an aggregator module 128. The permission access module 122 is representative of functionality to control access to data. For example, the permission access module 122 may grant access to members who are authorized to consume the data, e.g., view or download the data. The permission access module may control access to data stored with the social network service 102, separate feeds of data (e.g., feed source 104), and so on. As illustrated, memory 134 includes Owner Data 1 130, Owner Data N 132.

In additional examples, the permission access module 122 may control access to data that indicates an association between a member (e.g., the owner 106) and data that is publicly available. For example, the permission access module 122 may control access to a link (e.g., a uniform resource locator (URL)) that is configured to direct a web browser to a web page that contains data. In this way, the member may anonymously post the data with the feed source 104 while retaining the ability to share the data with other members such as family and friends via the social network service 102. Thus, the social network service 102 may be used to control access to the association between the member and the publicly available data. In the foregoing situation, the data at the feed source 104 is not associated with the member exclusive of the association, e.g., the link. This is to say, that the data may be publicly available though not associated with the member absent the association with the social network service 102.

The permission access module 122 may be configured to pull-in data from the feeds of data linked in a member's profile. For example, the permission access module 122 may download data from the feed source 104 to keep a copy of the data included in a web page linked, for example, by a URL. In some embodiments, the permission access module 122 may obtain further data (e.g., data forming an update) from the feed source 104 at scheduled intervals or on an occurrence of an event. The permission access module 122 may also perform other functions. For example, the permission access module 122 may parse data included in a feed of data and so forth.

In some embodiments, the social network service 102 may include one or more of an advertising module 136, a localization module 138, or a feed module 140. The social network service 102 may implement one or more of these modules to provide corresponding functions separately or in conjunction with the other functions described herein.

The advertising module 136 is representative of functionality to generate revenue, by presenting advertising to members of the social network service 102. The advertising module 136 may perform targeted advertising based on the data that is to be shared. For example, the advertising module 136 may present an advertisement for a photograph developing business when a member is viewing or posting digital photographs. A variety of other examples are also contemplated. The localization module 138 is representative of functionality to localize data to a plurality of locales. The localization module 138 may parse data from the feed of data. For example, the localization module 138 may obtain data that is not configured for consumption in a variety of locales and parse the data so that the data may be presented according to the consumer's locale, e.g., the member viewing the data.

The localization module 138 may be configured to form individual templates that include data localized to a particular locale, e.g., a human understandable language. The localization module 138 may conform the data in one or more of the following respects to a particular human language, a particular geographic region, according to a moral/cultural convention, to a technical convention used in a locale, and so on.

In some embodiments, the feed module 140 is included in the social network service 102 to filter data for presentation. The feed module 140 may be configured to provide a wide variety of functionality. For example, the feed module 140 may filter the data so the data is presented in a relevant manner for the consumer 110. The feed module 140 may also filter the data based on one or more attributes that are associated with the data. The feed module 140 may further filter the feed of data based on a user context such as an attribute of the user's state. For instance, when the consumer 110 is interacting with photographs the feed module 140 may filter the data so the consumer 110 may view recent photographs. In the foregoing example, the feed module 140 may be configured so the consumer 110 may view photographs posted by other members in the user's network (e.g., friends and family) available from multiple feeds of data, e.g., different web sites and so on.

Members, such as the owner 106, the client, and the consumer 110 are representative of functionality to interact with data from one or more of the feed source 104 or the social network service 102. As illustrated, the members each include an Internet connected application, such as a web browser (browser referenced respectively as 142, 144, 146), that is configured to access the web sites maintained by the social network service (referenced respectively as 148(1), 148(2), 148(3)) and/or the feed source 104. For instance, the owner 106 may post data (e.g., owner data 130(1)) to the web site maintained by the social network service 102. The members may be a variety of entities, such as personal computers, mobile computing devices, smart phones, laptops, and so on. The members may be configured with limited functionality (e.g., thin devices) or with robust functionality (e.g., thick devices). Thus, a device's functionality may relate to the device's software or hardware resources, e.g., processing power, memory (e.g., data storage capability), and so on. Other suitable Internet connected applications that may take advantage of the described approaches, techniques, and so forth (e.g., consume data) include, but are not limited to, WINDOWS32 clients (Microsoft Corp., Redmond, Wash.) (e.g., messenger chat clients) and mobile device applications.

Although the network 112 is illustrated as the Internet, the network 112 may assume a wide variety of configurations. For example, the network 112 may include a wide area network (WAN), a local area network (LAN), a wireless network, a public telephone network, an intranet, and so on. Further, although a single network is shown, the network 112 may be configured to include multiple networks. A wide variety of other examples are also contemplated.

In further instances, the functions performed by the illustrated entities may be combined. For instance, the social network service 102 may also provide feeds of data. The social network service 102 may provide feeds of data by pulling-in, data for local storage.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination of software, firmware, or hardware. In the case of a software implementation, the module, functionality, or logic represents program code that performs specified tasks when executed on a processor (e.g., CPU or CPUs). The program code can be stored in one or more computer readable media (e.g., one or more tangible media), and so on that do not encompass signals per se or carrier waves. The structures, functions, approaches, and techniques described herein may be implemented on a variety of commercial computing platforms having a variety of processors.

Figure 2:
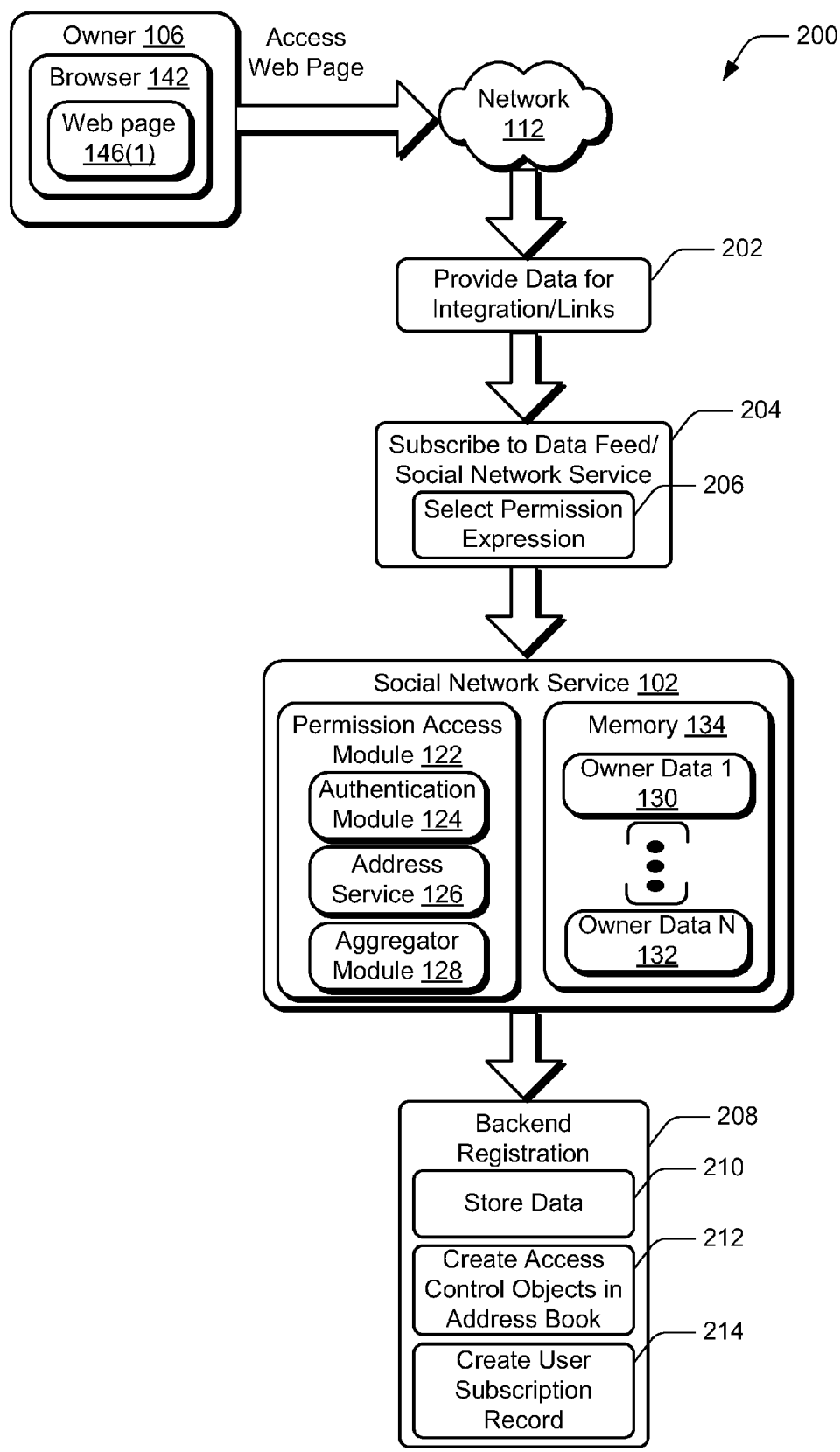
FIG. 2 is an illustration of a system in an example implementation showing implementation of the permission access module of FIG. 1 to register data.

FIG. 2 depicts a system 200 in an example implementation in which data is registered with the permission access module 122 of FIG. 1. By way of example, presume that the owner 106 is updating data in the owner's profile with the social network service 102. The owner 106 may, for instance, provide a link to a video stored with the feed source 104, or post additional data with the social network service (block 202).

In the illustrated embodiment, the social network service 102 is configured to combine a permission control with the data (block 204). For example, the social network service 102 may use an access control object to control access to the data (e.g., link) posted by the owner. Access to the data may be based on one or more permission expressions selected by the owner (block 206). Thus, the permission access module 122 may throttle access to the data according to the permission expressions. In this way, the permission access module 122 may set access to an extended network for the member, a network that includes the member, the member (e.g., himself/herself), and so forth. For example, a network that includes the member may be the owner's friends and family. In another example, an extended network for the member may be the owner's friends and family and friends and family of each of the friends and family of the owner 106.

The permission access module 122 may register the data (block 208), the access control object, and a user subscription record with a backend of the social network service 102. Examples of data, include but are not limited to, data posted to the social network service 102, an association, and so forth). The permission access module 122, using the address service 126, may store the data in the memory (block 210). In addition, the address service 126 may store the access control object in an address book maintained by the address service (block 212). In some embodiments, the address service 126 creates a user subscription record that is stored with the access control object in the address book (block 214). Having described sample subscription and backend registration, controlling access to data using a permission control is now described.

Figure 3:
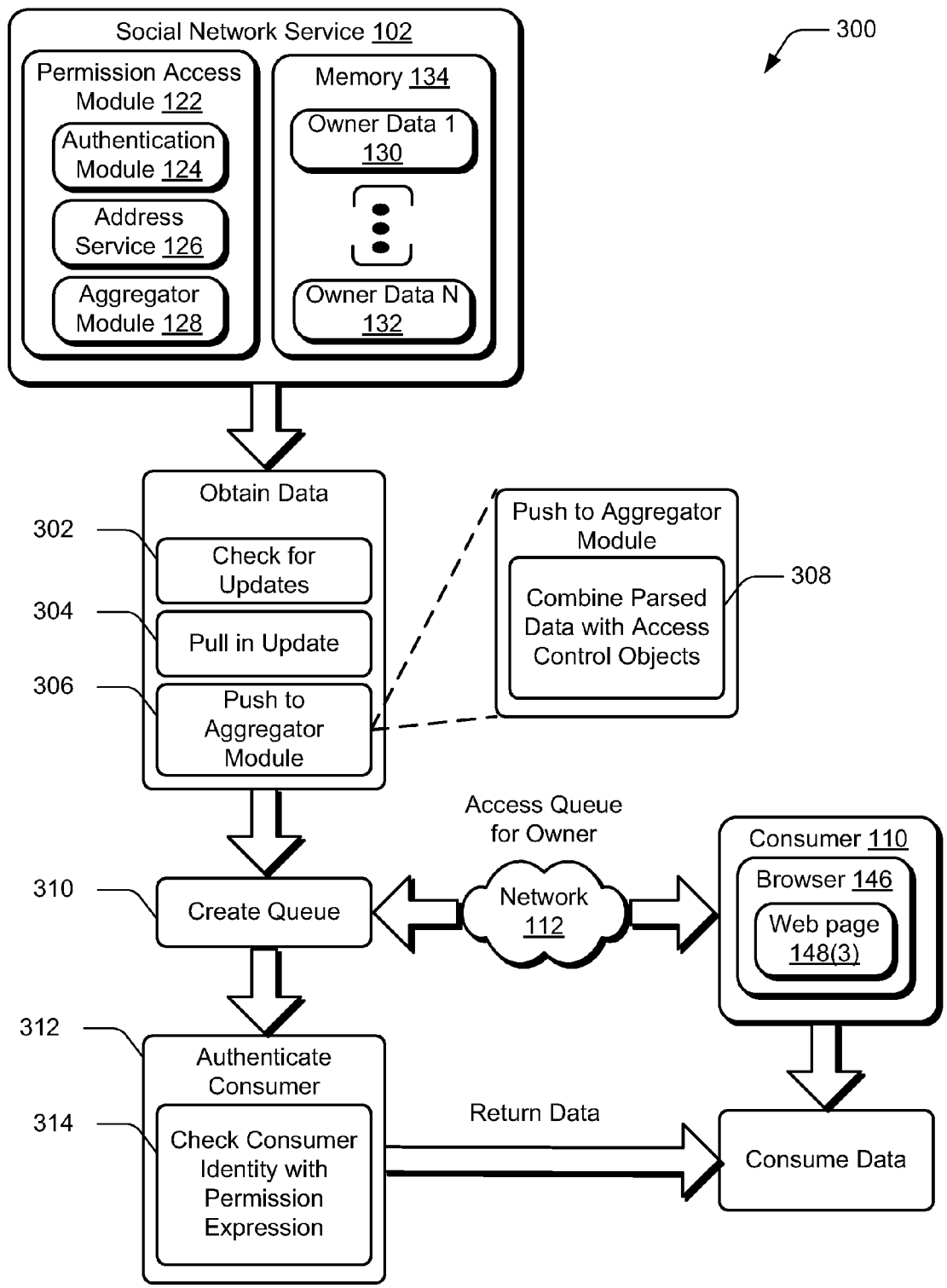
FIG. 3 is an illustration of a system in an example implementation showing implementation of the permission access module of FIG. 1 to control access to data.

FIG. 3 depicts a system 300 in an example implementation in which the permission access module 122 controls access to data through use of an access control object. By way of example, for discussion purposes alone and not limitation, the described implementation presumes that data is obtained (e.g., data forming an update) and that the consumer 110 is to be permitted access to the data.

As illustrated, the aggregator module 128 may be used to check for data forming an update. The aggregator module 128 is representative of functionality to aggregate data from one or more of a feed of data, from the memory 134, and so on. For example, the aggregator module 128 may follow the user subscription record to look for further data, e.g., updates, activity data stored with the feed source and so on (block 302). The aggregator module 128 may combine the data forming the update with an access control object and store the data in the memory 134. For instance, the permission access module 122 may pull-in the data forming the update (block 304) and subsequently push the data that forms the update to the aggregator module (block 306). In addition the aggregator module 128 may parse the data and combine the data that forms the update with an access control object (block 308).

In other examples, the permission access module 122 may obtain the data in a response to selection of a link in a member's profile. For instance, the permission access module 122 may obtain data included in a webpage that corresponds to a link in the owner's profile. The feed of data may be independent of the social network service 102.

As further illustrated in FIG. 3, the permission access module 122 may create a queue (block 310) in response to a request for access. For example, the permission access module 122 may create a queue for "what's new" e.g., data has been recently added or updated in the owner's profile.

The authentication module 124 is representative of functionality to check an identity associated with the request. In addition, the authentication module 124 may also authenticate a member's identity (block 312), e.g., the consumer's identity. The authentication module 124 may check the identity by comparing the identity with a permission expression (block 314), for the data indicated in the request, to determine whether to grant access to the data. For example, the authentication module 124 may check the consumer's identity with a list of identities in the permission expression to determine whether the consumer 110 may view the data. When the consumer's identity matches an identity that is permitted access, the social network service 102 may present the requested data. A variety of other examples also contemplated, further discussion of which may be found in relation to example procedures described below.

Figure 4:
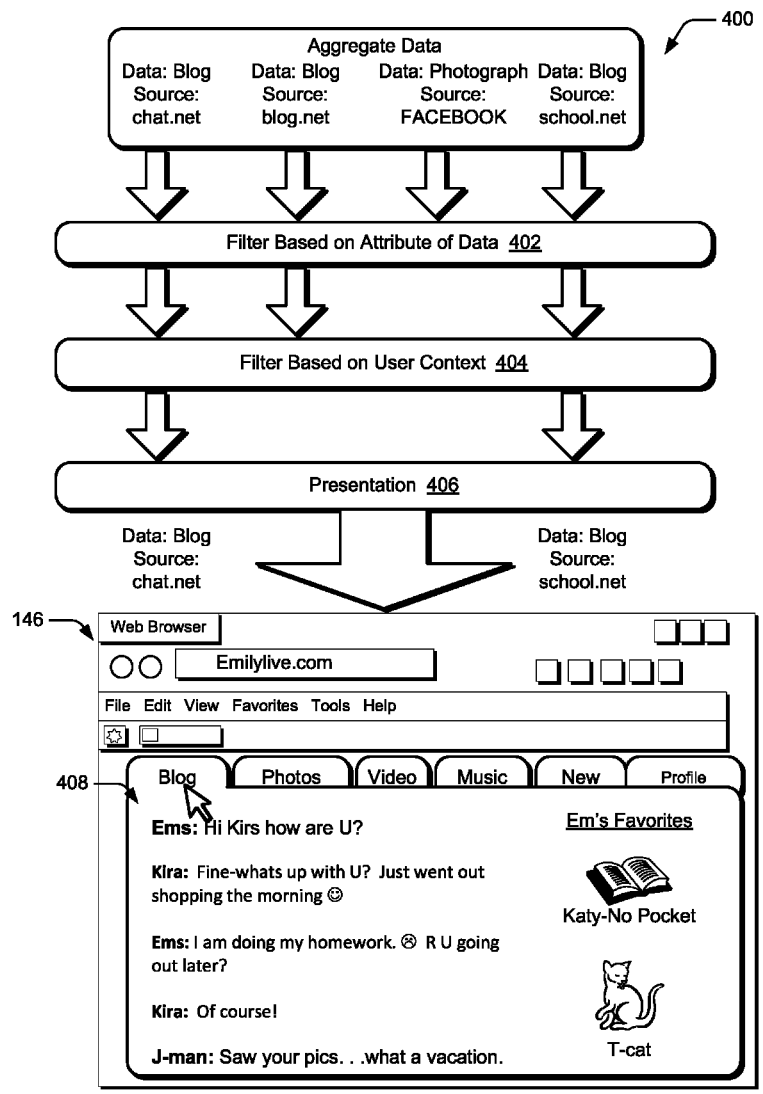
FIG. 4 is an illustration of a system in an example implementation showing implementation of the feed module of FIG. 1 to control presentation of data.

FIG. 4 depicts a system 400 in an example implementation in which data is filtered for presentation through execution of the feed module 140. The feed module 140 may perform the described functions in conjunction with other modules. For example, the feed module 140 may use the data parsed by the permission access module 122. Although data included in a feed of data is discussed, the data may be obtained from a variety of sources, e.g., separate third party sources, the memory 134, and so on.

The feed module 140 is representative of functionality to filter data for presentation based on attributes of the data (block 402). Additionally, the feed module 140 may also filter data based on a user context, e.g., the user context for the consumer (block 404). The feed module 140 may filter the data so the data is presented in meaningful manner for the consumer 110. For example, the feed module 140 may present photographs from the consumer's friends and family when the consumer 110 is viewing photographs. In the foregoing situation, the feed module 140 and/or the aggregator module 128 may aggregate photographs from a variety of sources. Example sources include, but are not limited to, third party sources, the memory 134, and so on. In another example, the feed module 140 may present data that has been changed or added, e.g., "what's new." A variety of other examples are also contemplated.

As illustrated, the feed module 140 may aggregate data from one or more feeds of data that are publicly available. Although independent feeds of data are discussed, it is to be apparent that the social network service 102 may maintain a copy of the data or provide the feed of data itself. The aggregated data may be associated with one or more member profiles. For example, the feed module 140 may present blog entries for the consumer's friends even though the blogs are posted on different web sites when the consumer 110 is blogging and has selected to receive blog entries from members in the consumer's network.

The data may be individually associated with one or more attributes that describe the data. Sample data attributes include, but are not limited to, a data type, status, profile update, and so forth. Other sample attributes may include location information, time, and technical data, e.g., settings, file standards, and so on. Example data types include, but are not limited to, a photograph, a video, a blog entry, and so on.

In addition to filtering based on attributes of the data, the feed module 140 may also filter the data based on user context (block 404). Accordingly, the feed module 140 may present data that is related to an attribute of the consumer's current state. Example user states include, but are not limited to, interacting with a photograph, interacting with video, blogging, viewing network status, updating network status, interacting with a profile, and so forth. Thus, the feed module 140 may present music recently posted by people in the consumer's network when the consumer 110 is listening to music. Likewise, the feed module 140 may present a blog entry by a person in the consumer's extended network (block 406) as shown in blog 408 on the web browser 146 when the consumer 110 is blogging.

The feed module 140 may check for updates to data based on attributes of the data and/or the user context, e.g., the consumer's context. Moreover, the consumer 110 may select other members that may present data using the feed module 140. For example, when the consumer 110 is blogging, the consumer 110 may select to receive data from the consumer's network. In contrast, when listening and sharing music, the consumer 110 may select to receive music from each member in the consumer's extended network. In this way, the consumer 110 may use the feed module 140 to customize the user experience with the data, e.g., what data is presented.

The feed module 140 may perform the described functions in conjunction with other modules. For example, the feed module 140 may use the data parsed by the permission access module 122. Although data included in a feed of data is discussed, the data may be obtained from a variety of sources, e.g., separate third party sources, the memory 134, and so on.

Figure 5:
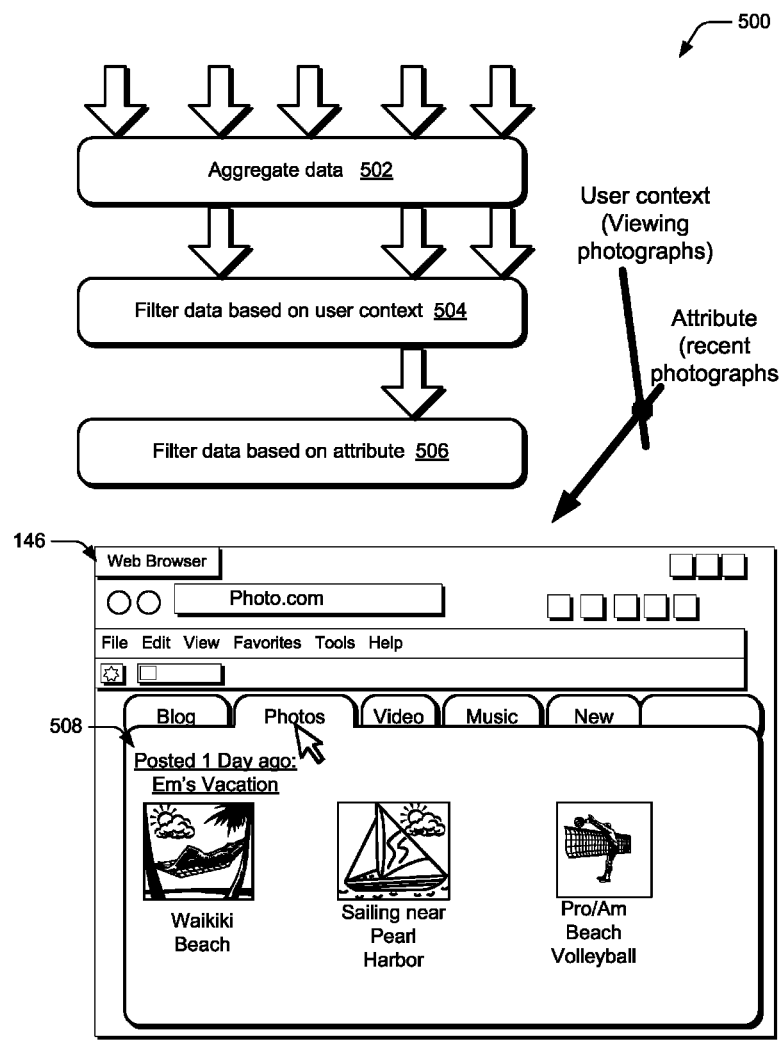
FIG. 5 is an illustration of a system in an example implementation showing implementation of the feed module of FIG. 1 to select data filtering.

FIG. 5 depicts a system 500 in an example implementation in which data is filtered for presentation through execution of the feed module 140. As illustrated, the feed module 140 may filter data aggregated from one or feeds of data. The feed module 140 may be configured to filter the data so the consumer 110 may select what data is presented based on a user context, a data type for the data, and so on. For instance, the feed module 140 may aggregate data from various feeds of data (block 502). In the previous instance, the data may comprise further data, e.g., data forming an update to data already obtained.

In embodiments, the consumer 110 may use the feed module 140 to select how the data is filtered. Thus, the consumer 110 may configure the feed module 140 to customize how the data is experienced, e.g., view photographs of warm weather locations.

For instance, the consumer 110 may select to view data that corresponds to the consumer's current state, e.g., viewing photographs (block 504). By configuring the feed module 140 to permit selection, the data presented by the social network service 102 may correspond to the consumer's state, e.g., present photographs when the consumer 110 is viewing photographs via browser 146.

In addition, the feed module 140 may be configured to accept selection of how the data is to be filtered, e.g., an attribute, a user context, and so on. For example, the consumer 110 may select to receive data which is associated with a particular data type, e.g., audio data, data included in a wav file. Attributes may also include a status (e.g., updated or new data (block 506)) or a profile update.

In the illustrated embodiment, the feed module 140 is used to present photographs recently posted by the consumer's friend, Emily 508 via browser 146. Having discussed data filtering to customize a user experience, localization of data is now discussed. As is to be apparent, customizing the user experience may be employed independently or in conjunction with permission model access, targeted advertising, and/or localization of data.

Figure 6:
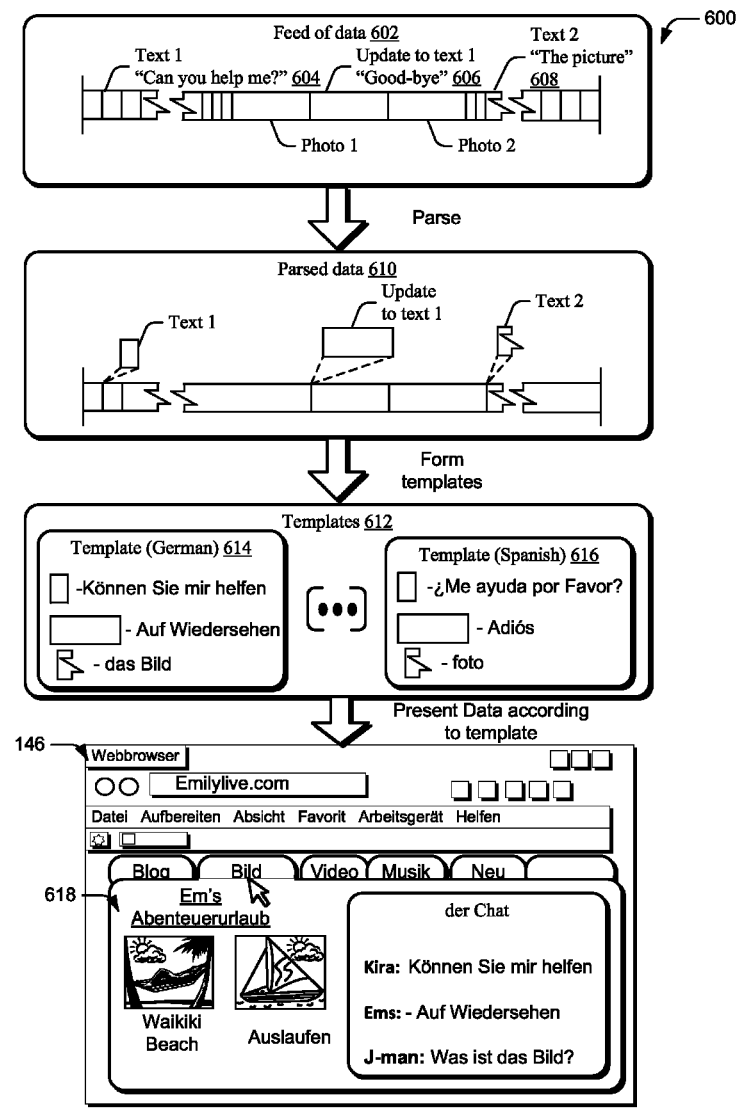
FIG. 6 is an illustration of a system in an example implementation showing implementation of the localization module of FIG. 1 in greater detail.

FIG. 6 depicts a system 600 in an example implementation in which data is localized for presentation through execution of the localization module 138.

As illustrated, a feed of data (block 602) may include data that is not localized (e.g., Text 1 604, Update to Text 1 606, and Text 2 608 are expressed in English). Data that is not localized (e.g., un-localized data) may not be configured for publication in a plurality of locales. For example, while the data may comprise text expressed in one human language, the text may not be configured for expression in additional human languages. This is to say, that while the un-localized data is expressed in a first human language, the un-localized data may not be presented in a second human language.

Besides a human language used to express the data (e.g., text), other considerations may serve as a basis for localizing the data. Example considerations include whether the data conforms to one or more of: a particular geographic region (e.g., is the data of local relevance), according to moral consideration, cultural considerations, according to a technical standard, and so on. Examples of the foregoing include Chinese cultures regard the color red as lucky, people familiar with English language read from left-to-right, people familiar with the Hebrew language read right-to-left, and so forth.

The localization module 138 may parse the data in the feed of data (block 610). By parsing the data, the localization module 138 may conform the data in discrete portions for the locale. In this way, the localization module 138 may parse the data that is to be localized from data that is not to be localized. For example, the localization module 138 parses text (e.g., "Can you help me?") from a picture. In another example, text associated with a tab is parsed from data used to present the tab. In still another example, data that controls the color of graphical icon is parsed from the data that determines the shape of the graphical icon.

In further embodiments, the localization module 138 may be configured to parse the data based on canonicalization of the data within the feed of data, based on attributes of the data, and so on. The data in the feed may be organized according to one or more patterns or conventions. The localization module 138 may identify the canonicalization patterns from the feed of data in order to parse the data for localization, e.g., translation.

With data to be localized (e.g., text) parsed from other data (e.g., the picture), the localization module 138 may form a template for each locale that is to be supported (block 612).

For example, a German template 614 and a Spanish template 616 are shown. The localization module 138 may customize the data for the particular locale so the data conforms to conventions for the locale. Localization may be based on canonicalization within the data feed. For example, the localization module 138 may identify a canonicalization pattern in the feed of data. Accordingly, the localization module 138 may translate the text into a human language used in the locale, e.g. translate English text into German text 618 presented via browser 146. The localization module 138 may use the canonical pattern as a basis for the translation.

It is to be appreciated that some data included in the template may not be localized. For example, while the text "Mount Rainier" may be translated, a person's name may not be translated.

While in the previous example the template includes data that is localized and data that is not localized, in other instances, the template may be reserved for the data that is localized. Thus, the localization module 138 may combine the localized data from the template with data that is not suited for localization in response to a request for a localized version of the data. The data that is not localized may be stored in the memory 134 or obtained from the feed source 104. The localization module 138 may present the localized data using the template in response to a request for the data. In some instances, the localization module 138 may select which template is to be used based on a default browser language included in a hypertext transfer protocol (HTTP) header associated with a web browser. In other instances which template is to be used may be based on an internet protocol (IP) address associated with the request. For example, when a request is received for an IP address from the United States, the localization module 138 may use a template for U.S. English. In contrast, when the request is from an IP address in Germany, the localization module 138 may present the data in German. In this way, the localization module 138 may support a plurality of different human languages, cultural and/or religious considerations, locales, and so forth that apply different conventions.

In other embodiments, the localization module 138 may be configured to determine which template is to be used from a web browser that requested the data. For example, the localization module 138 may present the data in English when the web browser is configured for English. A variety of other examples are contemplated. In addition, the localization module 138 may accept manual selection of a template.

Although the described approaches and techniques are discussed with respect to the localization module 138, in some instances, other modules and/or services may be used to perform the described functions. For example, instead of the localization module 138 parsing the feeds of data as described, the permission access module 122 may parse data from the feeds of data for the localization module 138.

Figure 7:
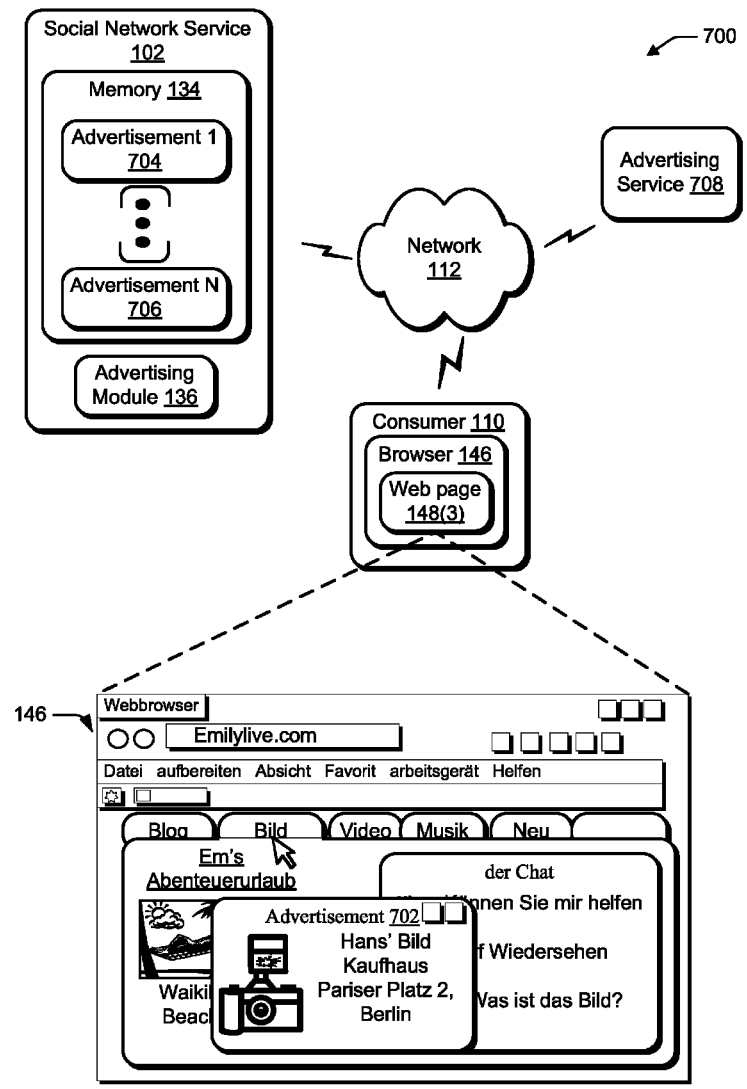
FIG. 7 is an illustration of a system in an example implementation showing implementation of the advertising module of FIG. 1 in greater detail.

FIG. 7 depicts a system 700 in an example implementation in which advertising is presented through execution of the advertising module 136. The advertisement module 136 may generate revenue by performing targeted advertising based on data shared via the social network service 102. In the illustrated example, the advertising module 136 may present an advertisement that is related to data accessed by the browser 146, e.g., an advertisement 702 for a photography store is presented when the customer is viewing, storing, or linking to photographs.

The advertising module 136 may determine which advertisement is to be presented by checking attributes of the data being shared (e.g., viewed, stored, and so on) for attributes for which an advertiser paid to present an advertisement. In further instances, the advertisement that is presented may be based on the member's locale, the user context for the member, a determination whether the member is permitted access to data, and so on. Additional examples include, but are not limited to what other members are in the member's network or extended network, and so on. A variety of other examples are also contemplated.

As illustrated, the memory 134 may include advertisements (illustrated as advertisement 1 704, advertisement N 706) that may be presented by the advertising module 136 when the data being shared is related to one of the advertisements. In further instances, the advertising module 136 may access an advertising service 708 that provides advertisements. As is to be apparent that the advertising module 136, the techniques, and approaches described herein may be used in conjunction with the other modules, services, techniques and approaches described with respect to FIGS. 1 through 6 and 8 through 11.

Example Procedures

The following discussion describes procedures that may be implemented utilizing the previously described systems, techniques, approaches, and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the systems described above.

Figure 8:
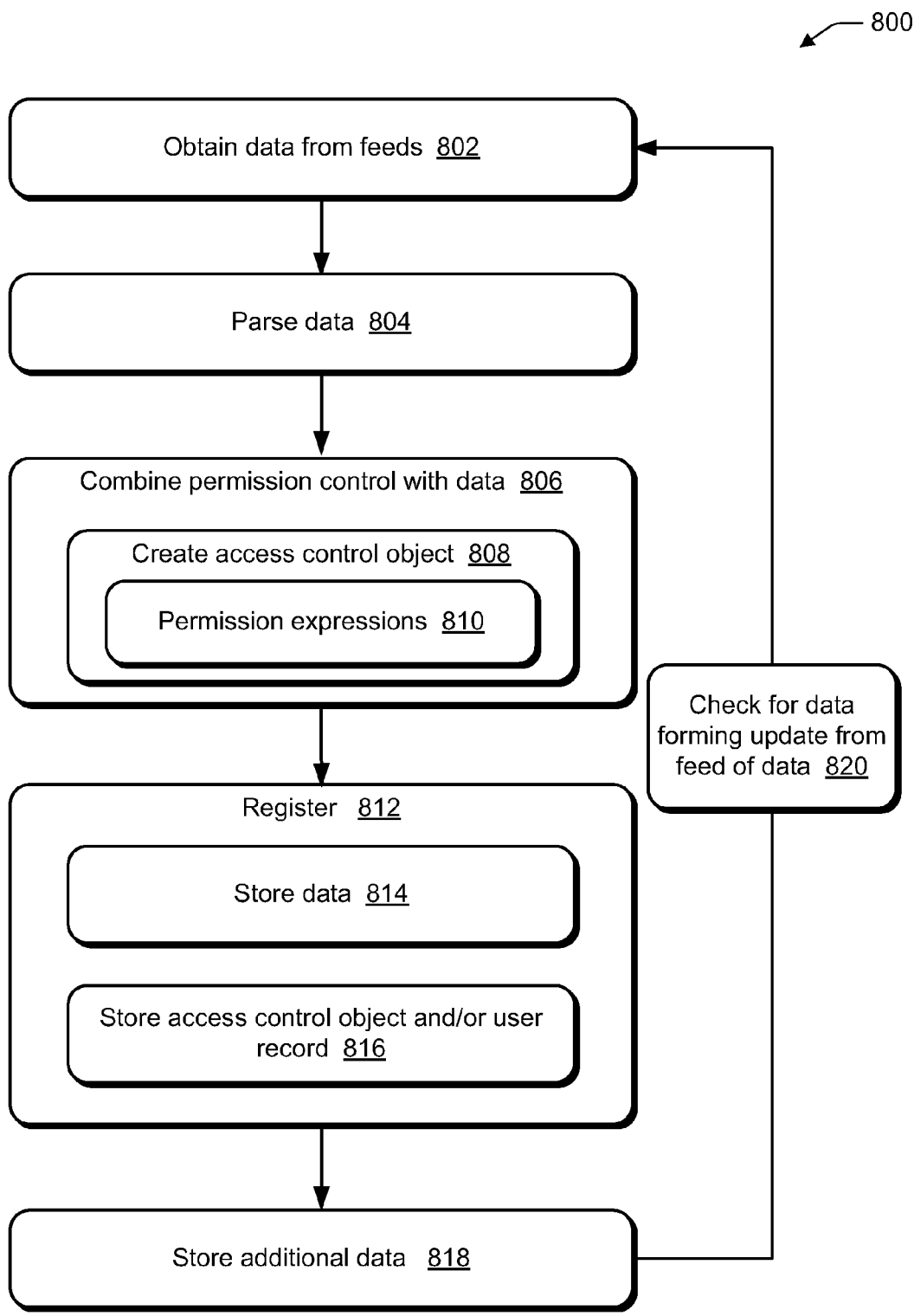
FIG. 8 is a flow diagram depicting a procedure in an example implementation that is used to register data for use in controlling access to the data.

FIG. 8 depicts a procedure 800 in an example implementation in which permission model techniques are implemented to control access to data. In embodiments, the data is included in a feed of data that is publicly available but not associated with a member of a social network service 102 absent the data indicating the association with social network service 102.

Data from the feed of data is obtained (block 802). The obtained data may be associated with a member of a social network service 102. For example, the aggregation module 128 may pull-in the data by following a uniform resource locator (URL) that points to a web site that contains the data. In other instances, the data may be an association between a member and some data, e.g., a URL that points to a web page that includes data for the member.

The data is parsed from the feed of data (block 804). For example, the social network service 102 may parse data that was recently added to the feed of data referenced by a link in the owner's profile. Although data may be parsed based on its recent addition, a variety of other factors may serve as the basis for parsing the data from the feed of data.

The data is combined with a permission control (block 806). As illustrated, an access control object is created (block 808). For example, the permission access module 122 may combine the data with the access control object. The access control object may include one or more permission expressions selected by the owner of the data (block 810). The permission expression may be used to grant or deny access to the data.

The data and access control object are registered with a backend system (block 812). As illustrated, registering the data may include storing the data (block 814) in memory and storing the access control object in an address book with a user subscription record (block 816).

In additional embodiments, additional data may be stored in memory (block 818). For example, a member may post additional data that is related to the data stored in block 814 with the social network service 102. Thus, the permission access module 122 may use the access control object to control access to the additional data.

A check for a further data may be performed (block 820). The further data may be combined with an access control object and registered in a similar manner as is described above with respect to blocks 802 through 816.

Figure 9:
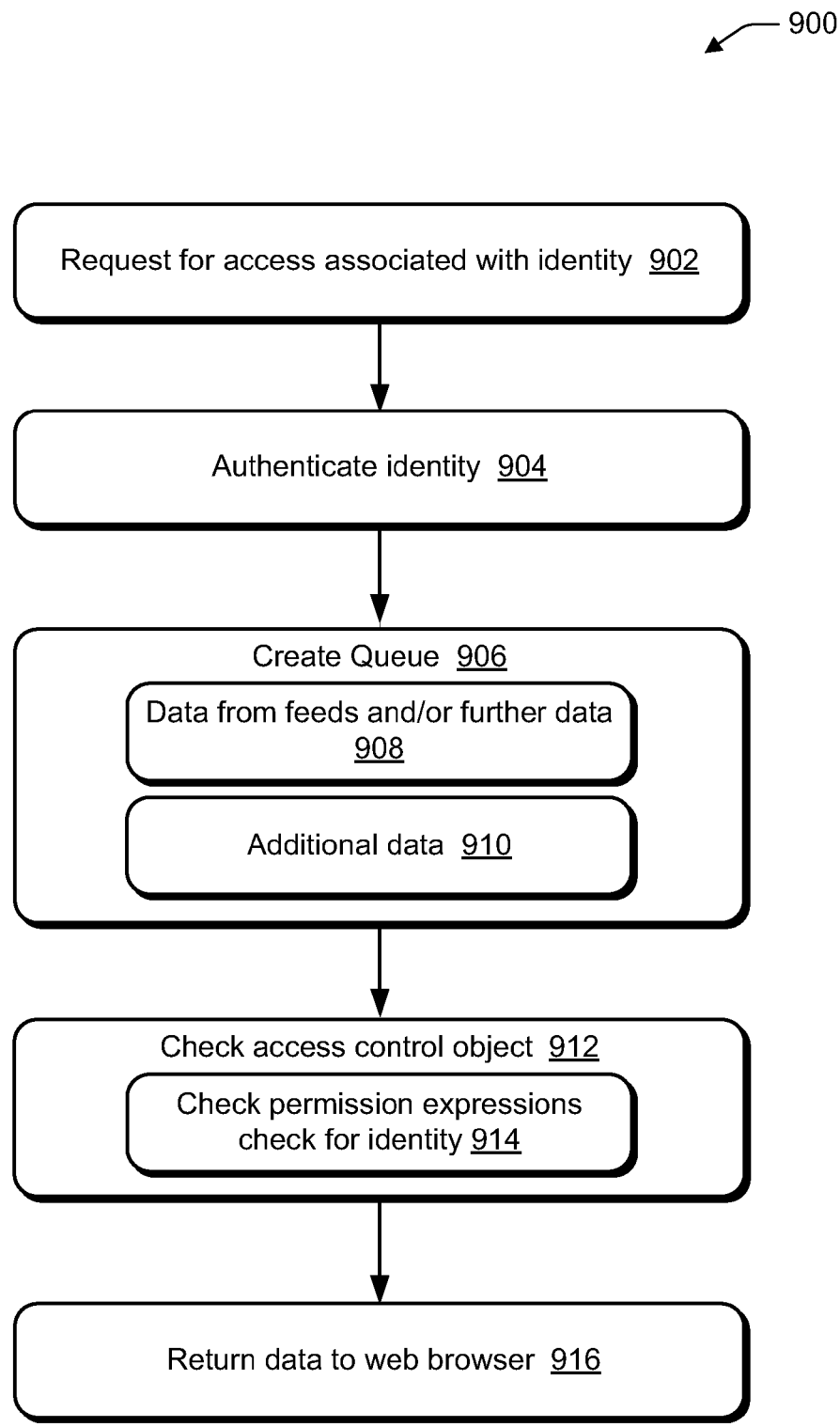
FIG. 9 is a flow diagram depicting a procedure in an example implementation that is used control access to data.

FIG. 9 illustrates a procedure 900 in an example implementation in which permission model techniques are implemented to control access to data. The procedure may be used in conjunction with the procedure 800 described with respect to FIG. 8 above and/or the procedures described with respect to FIGS. 10 and 11. A request for access is received (block 902). The request may be associated with an identity, such as a member's identity that serves to identify the member.

The identity is authenticated (block 904). For example, the authentication module 124 may authenticate that the request is indeed from the member. A variety of techniques may be used to authenticate the identity. For example, security tokens, passwords, digital certificates, and so on may be used to confirm the identity of the member that made the request for access to the data.

A queue is created (block 906). The queue may include data from one or more of a feed of data (block 908), additional data posted to the social network service (block 910), and so on. For example, the queue may include recently posted data in an owner's profile so that the member may view recent additions and/or changes to the owner's profile.

The access control object is checked to determine whether the member is to be granted access to the data (block 912). For example, the authentication module may check to determine whether the permission expressions in the access control object allow the member to access the data (block 914). The data is returned to a web browser (block 916) when the identification matches an identification permitted access by the permission expression. A variety of other examples are contemplated without departing from the spirit and scope thereof.

Figure 10:
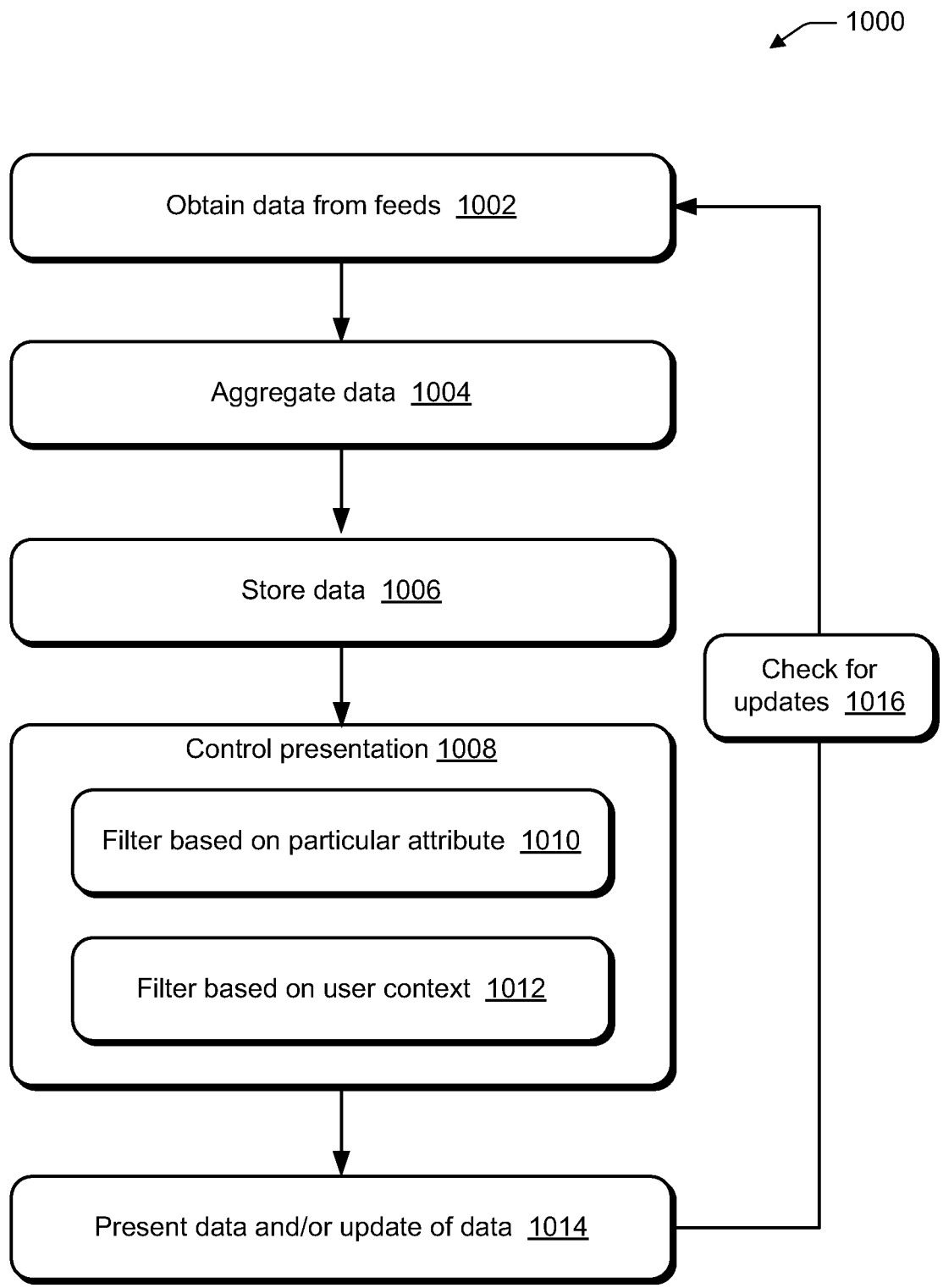
FIG. 10 is a flow diagram depicting a procedure in an example implementation that is used to filter data to customize presentation of the data.

FIG. 10 depicts a procedure 1000 in an example implementation in which data filtering techniques are implemented. The procedure 1000 may be used in conjunction with the other procedures, methods, approaches, systems, and techniques discussed herein. For example, the procedure 1000 may be employed with a permission model techniques described in FIGS. 1, 2, 8, and 9.

As illustrated, data is obtained from one or more feeds of data (block 1002). Sample feeds of data may include photograph/video sharing sources (e.g., YOUTUBE (YouTube, LLC, San Bruno, Calif.), PHOTOBUCKET (Photobucket, Inc., San Francisco, Calif.); communication sources (e.g., TWITTER (Twitter, Inc. San Francisco, Calif.)); and so on. As noted above, the data may comprise content in a variety of formats (e.g., video, photographs); file formats (e.g., jpeg, tiff, wav), and so on. Data may also include attributes that describe other data, e.g., content. Although data obtained from third party feeds of data are discussed, the data may be obtained from local memory, from independent sources, separate sources, from members of the social network service 102, and so forth.

As part of obtaining data, the data may be parsed into constituent portions. For example, data from a photograph sharing web site may be parsed into files that contain the data that forms the photograph. As is to be apparent, the data may also be parsed so that one or more attributes are included with the data, e.g., content.

The data is then aggregated (block 1004). For example, data from separate third party feeds of data may be aggregated. Although data of a common data type may be aggregated (e.g., blog entries), in other instances, different types of data may be aggregated. An example of aggregating different types of data include, but are not limited to, photographs, videos, blog entries, and so forth for each member in the consumer's extended network. Other combinations and types of data are also possible.

In one or more embodiments, the data is stored in memory (block 1006). The data may be stored in the memory for subsequent presentation. The data may be stored in the memory so that copy of the data is available if the feed of data were to become unavailable, to speed access to the data, to annotate the data, and so forth. In further instances, a decision whether data is maintained in the memory may be tied to revenue generation, e.g. has a member agreed to accept advertising, or the members pays a monthly subscription fee.

Presentation of the data may be controlled (block 1008). As illustrated, what data is to be presented may be filtered based on one or more of a selected attribute of the data (block 1010), user context (block 1012), and so forth. For example, the consumer 110 may select to receive a particular type of data (e.g., recent updates from members of the consumer's network) that corresponds to the consumer's context, e.g., an attribute of the user state of the consumer 110. As a result, the consumer 110 may customize the experience with the data.

The data is the presented (block 1014). As discussed with regard to FIG. 1, the data may be forwarded via a web site to the consumer's web browser 146.

In other instances, a check for updates may be performed (block 1016), e.g., data forming an update may be performed. For example, data maintained with the social network service 102 may be presented and then a check may be performed to determine whether any further data that is associated with the data is available. A variety of other examples are also contemplated without departing from the spirit and scope thereof.

Figure 11:
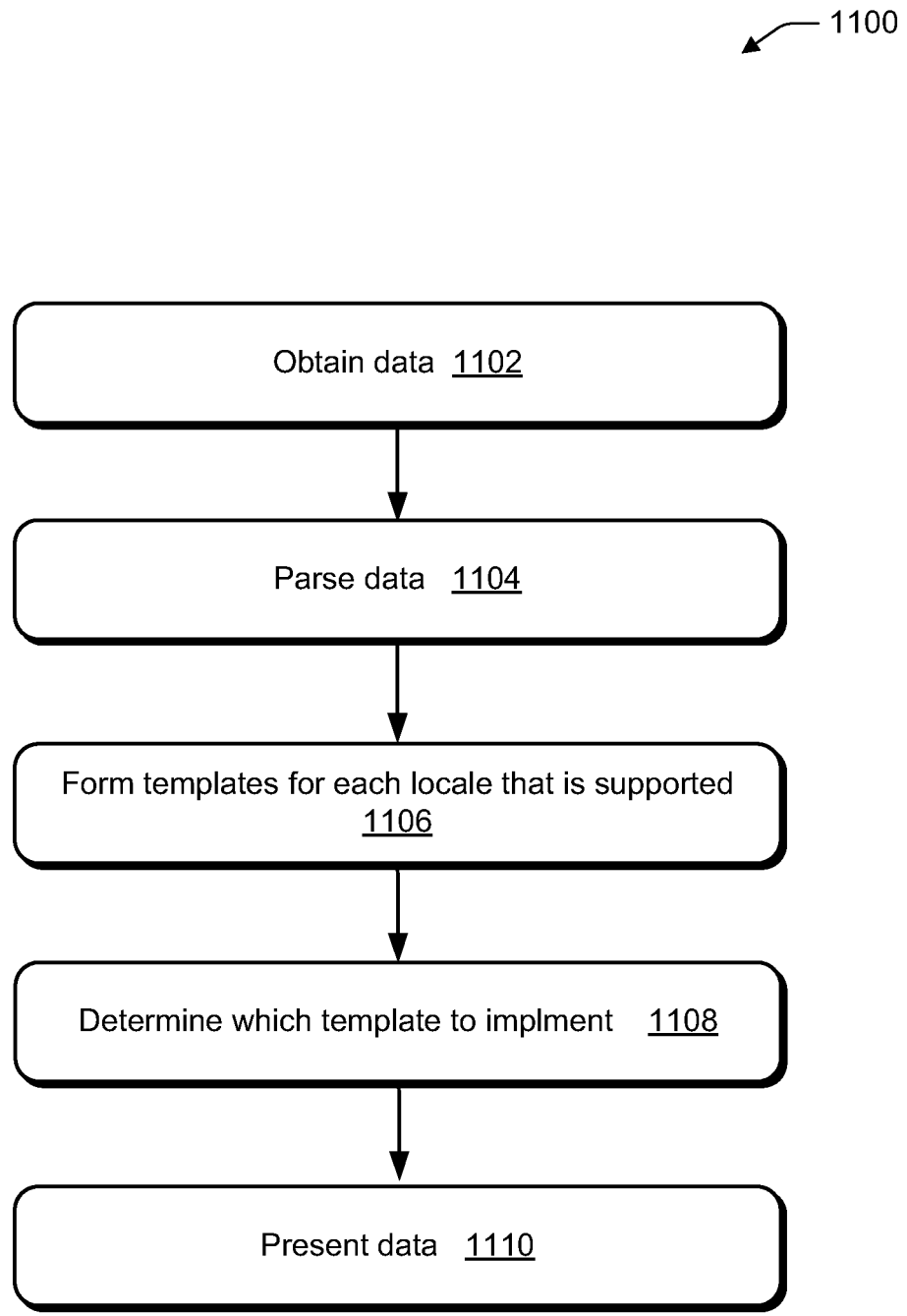
FIG. 11 is a flow diagram depicting a procedure in an example implementation that is used to localize data.

FIG. 11 depicts a procedure 1100 in an example implementation in which data localization techniques are implemented. The procedure 1100 may be used in conjunction with the techniques, approaches, entities previously described.

As illustrated, the data is obtained (block 1102). Although data that is publicly available from an independent source is discussed, the data may also be obtained from other sources including local memory and so on. In some embodiments, the data is not localized. Data that is not localized, although expressed in a human language may not be configured for expression in other human languages or otherwise conform to conventions employed in different locales.

The data is parsed (block 1104). The data may be parsed based on attributes of the data, data types, when the data was posted, a canonicalization pattern identified from the feed of data, and so on. For example, a localization module 138 may identify whether the data in the feed of data is arranged according to a local convention in order to localize the data (e.g., translate text, otherwise conform the data to a local convention).

A plurality of templates may be formed from the data (block 1106). Each of the templates may include a version of the data localized to a particular locale that is to be supported. In embodiments, the data is localized (e.g., translated) based on a canonicalization pattern identified in the feed of data. Although locales are discussed, the data may be localized to particular human understandable language (e.g., French, English, German). As discussed, the data may be conformed to a variety of conventions implemented by the particular locale. Examples of consideration that may serve as a basis for how the data is to be localized include, but is not limited to, moral/cultural considerations, regional considerations, geographic considerations, and so forth.

In response to a request for the data, a determination is made as to which template supports a particular locale associated with the request (block 1108). The template that is to be used is determined (block 1108). The determination may be may be made based on an internet protocol address associated with the request, a language associated with a web browser (e.g., a default browser language included in the HTTP header for the customer's browser 146) that made the request, manual selection, and so on.

The data that is localized is presented (block 1110) using the template that corresponds to a particular locale. For example, the data may be presented in German when a German template is used. A variety of other examples are also contemplated.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A system comprising:
   one or more processors; and
   one or more computer-readable devices comprising instructions that are executable by the one or more processors to provide a service to:
   parse content, based on a canonicalization pattern in the content, from a third party source that is publically available and includes text that is not localized;
   responsive to the parsing, form a template from the content that includes the text in a human language specific to a particular locale that is to be supported and conforms the data according to a moral convention used in the particular locale;
   filter the content for presentation based, at least in part, on a context of a computing device separate from the service, the context of the computing device including an attribute of a current state of the computing device; and
   using the formed template to cause the computing device to present the filtered content with the text in the human language that corresponds to the particular locale from which a request for the content is received, in which the human language is different from a human language implemented by the text that is not localized.

2. A system as described in claim 1, wherein the instructions are further executable to cause the service to maintain one or more templates that each correspond to locales for which the text is to be localized, said templates include a template for the locale from which the request for the content is received, said templates being formed based on the canonicalization pattern and the content.

3. A system as described in claim 2, wherein said templates include text translated based on the canonicalization pattern.

4. A system as described in claim 3, wherein the content comprises one or more updates to content previously obtained from the third party source.

5. A system as described in claim 1, wherein the content is included in a feed of content that is available via a network.

6. A system as described in claim 1, wherein the particular locale from which the request is received is determined based on an internet protocol address associated with the web browser.

7. A system as described in claim 1, wherein the content is obtained from a plurality of feeds of content.

8. A method comprising:
- using a processor, parsing content, based on a canonicalization pattern in the content, from a third party source that is publically available and includes text that is not localized;
- responsive to the parsing, using the processor, forming a template from the content that includes the text in a human language specific to a particular locale that is to be supported and conforms the data according to a cultural convention used in the particular locale;
- using the processor, filtering the content for presentation based, at least in part, on attributes of the data for presentation; and
- using the formed template to cause the computing device to present the filtered content with the text in the human language that corresponds to the particular locale from which a request for the content is received, in which the human language is different from a human language implemented by the text that is not localized.

9. A method as described in claim 8, further comprising maintaining one or more templates that each correspond to locales for which the text is to be localized, said templates include a template for the locale from which the request for the content is received, said templates being formed based on the canonicalization pattern and the content.

10. A method as described in claim 9, wherein said templates include text translated based on the canonicalization pattern.

11. A method as described in claim 10, wherein the content comprises one or more updates to content previously obtained from the third party source.

12. A method as described in claim 8, wherein the content is included in a feed of content that is available via a network.

13. A method as described in claim 8, wherein the particular locale from which the request is received is determined based on an internet protocol address associated with the web browser.

14. A method as described in claim 8, wherein the content includes one or more of:
- a photograph, or a blog entry.

15. A device comprising:
- a computer-readable device comprising instructions that are executable by a processor to provide a service to:
  - parse content, based on a canonicalization pattern in the content, from a third party source that is publically available and includes text that is not localized, the text that is not localized being associated with a blog entry;
  - responsive to the parsing, form a template from the content that includes the text in a human language specific to a particular locale that is to be supported and conforms the data according to a technical convention used in the particular locale;
  - filter the content for presentation based, at least in part, on a context of a computing device separate from the service, the context of the computing device including an attribute of a current state of the computing device; and
  - using the formed template to cause the computing device to present the filtered content with the text in the human language that corresponds to the particular locale from which a request for the content is received, in which the human language is different from a human language implemented by the text that is not localized.

16. A device as described in claim 15, wherein the instructions are further executable to cause the service to maintain one or more templates that each correspond to locales for which the text is to be localized, said templates include a template for the locale from which the request for the content is received, said templates being formed based on the canonicalization pattern and the content.

17. A device as described in claim 16, wherein said templates include text translated based on the canonicalization pattern.

18. A device as described in claim 17, wherein the content comprises one or more updates to content previously obtained from the third party source.

19. A device as described in claim 15, wherein the particular locale from which the request is received is determined based on an internet protocol address associated with the web browser.

20. A device as described in claim 15, wherein the instructions are further executable to determine the particular said human language based on a human language associated with a web browser that requested the localized data.

\* \* \* \* \*